United States Patent
Zhu et al.

(10) Patent No.: US 8,104,702 B2
(45) Date of Patent: Jan. 31, 2012

(54) APPARATUS FOR UNIFORMLY DISPERSING ADDITIVE PARTICLES IN FINE POWDERS

(75) Inventors: Jingxu Zhu, London (CA); Hui Zhang, London (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 12/960,194

(22) Filed: Dec. 3, 2010

(65) Prior Publication Data

US 2011/0121113 A1   May 26, 2011

Related U.S. Application Data

(62) Division of application No. 11/601,846, filed on Nov. 20, 2006, now Pat. No. 7,878,430.

(51) Int. Cl.
    *B02C 23/20*   (2006.01)
(52) U.S. Cl. .......................................... 241/60
(58) Field of Classification Search ............ 241/60, 241/22, 101.8, 25, 79.1, 101.6
    See application file for complete search history.

(56) References Cited

U.S. PATENT DOCUMENTS

| | | |
|---|---|---|
| 5,171,613 A | 12/1992 | Bok et al. |
| 5,498,479 A | 3/1996 | Nishida et al. |
| 5,567,521 A | 10/1996 | Nishida et al. |
| 5,635,548 A | 6/1997 | Kittle et al. |
| 5,946,088 A | 8/1999 | Aldridge |
| 5,948,866 A | 9/1999 | Takeda et al. |
| 6,408,153 B1 * | 6/2002 | Vandewinckel et al. ...... 399/253 |
| 6,491,242 B1 | 12/2002 | Dingee et al. |
| 6,684,917 B2 | 2/2004 | Zhu et al. |
| 6,764,802 B2 * | 7/2004 | Maric et al. ............... 430/137.14 |
| 6,833,185 B2 | 12/2004 | Zhu et al. |
| 2005/0136353 A1 | 6/2005 | Sato et al. |
| 2005/0186499 A1 * | 8/2005 | Okubo et al. ............ 430/137.18 |
| 2005/0202088 A1 * | 9/2005 | Hanshermann et al. ...... 424/471 |

FOREIGN PATENT DOCUMENTS

| | | |
|---|---|---|
| EP | 0214362 B1 | 2/1986 |
| JP | 61146327 A1 | 7/1986 |
| JP | 02102730 A2 | 4/1990 |
| WO | 2005102543 A1 | 11/2005 |

OTHER PUBLICATIONS

International Search Report, PCT/CA2007/002072 filed Nov. 19, 2007, Completed Feb. 7, 2008.

* cited by examiner

*Primary Examiner* — Dana Ross
*Assistant Examiner* — Matthew G Katcoff
(74) *Attorney, Agent, or Firm* — Lynn C. Schumacher; Hill & Schumacher (57) ABSTRACT

Blending methods for adding and uniformly mixing a small fraction of relatively small particles (additives) to a bulk particulate powder of larger size than the additives. In particular, the present invention provides blending methods for adding and uniformly mixing a small percentage of flow/fluidization additives into fine powders, especially fine paint powders. The fine powder and additives are first pre-mixed for macro-scale homogeneity and then further mixed at a micro-scale (such as with a screen mixing process) for micro-scale homogeneity. With these methods, optimum dispersions and maximum functionalities of additives can be obtained and the disadvantages caused by severe agglomerates of additives can be avoided.

18 Claims, 9 Drawing Sheets

PRIOR ART

Figure 11

APPARATUS FOR UNIFORMLY DISPERSING ADDITIVE PARTICLES IN FINE POWDERS

CROSS REFERENCE TO RELATED U.S. APPLICATION

This patent application is a Divisional application of U.S. patent application Ser. No. 11/601,846 filed on Nov. 20, 2006 now U.S. Pat. No. 7,878,430, in English, entitled METHOD AND APPARATUS FOR UNIFORMLY DISPERSING ADDITIVE PARTICLES IN FINE POWDERS, which is incorporated herein by reference in its entirety.

FIELD OF THE INVENTION

The present invention relates to methods for uniformly blending superfine additive particles into fine powders, and more particularly, the present invention relates to methods of uniformly blending and dispersing a small fraction of nano-sized particles into micro-sized particles. In addition, the present invention also relates to methods of blending superfine flow/fluidization additives into fine powders, in particularly fine paint powders, to enhance the flowability of the fine powders.

BACKGROUND OF THE INVENTION

There are numerous occasions where blending a fraction of smaller particles into larger particles are required. Often, when the smaller particles are very small, they tend to agglomerate among themselves, making it difficult to disperse them uniformly into the bulk of the relatively larger particulate materials. However, in many cases, a uniform dispersion is very important so that it is essential to break down as many agglomerates as possible and to break down the larger agglomerates of the smaller particles. One such example is in ultrafine powder coating where nano-sized particles need to be added into the fine coating powders to enhance their flowability and in some cases also to add special features to the coating surface.

Figure 1:
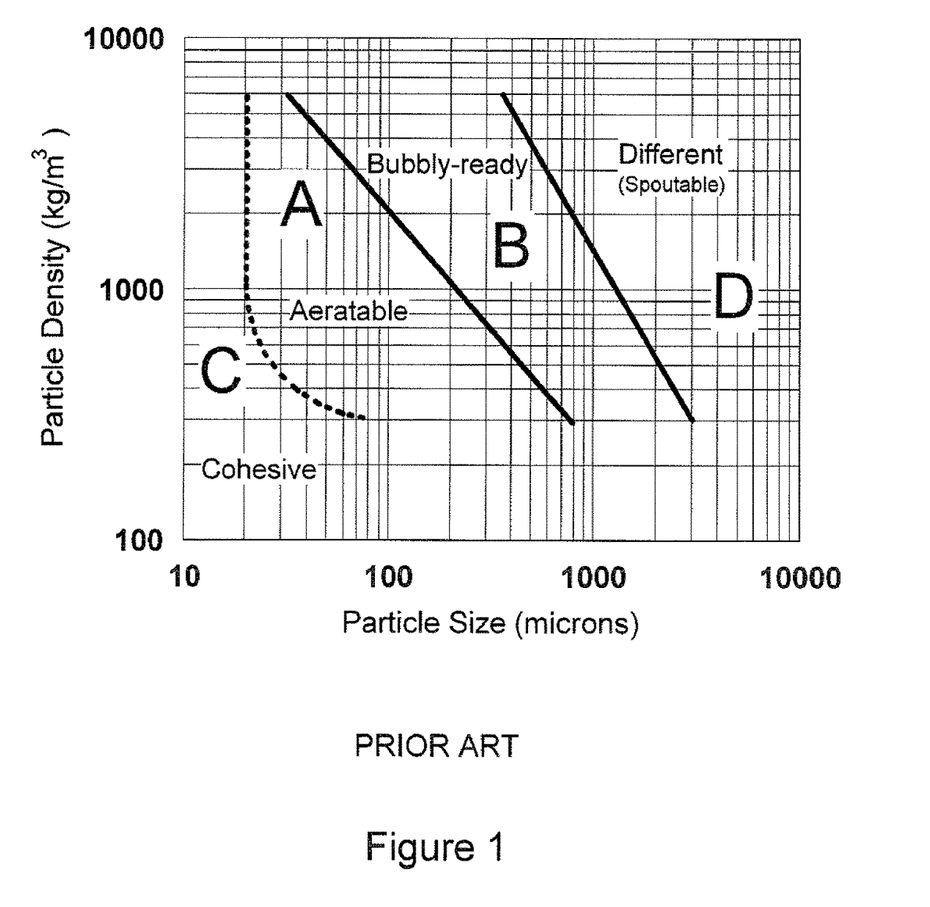
FIG. 1 is a Prior Art plot showing Geldart's classification of powders according to their fluidization properties.

It is generally known that powders become more difficult to handle as their sizes become smaller, because the strong interparticle forces make the particles agglomerate and the powder cohesive. The most important theories with regard to fine powder fluidization and handling are the Geldart Powder Classification (Geldart, D., Types of Gas Fluidization, *Powder Technology*, Vol. 7, 1973, 285-297) and the interparticle forces (Visser, J., An invited review—Van der Waals and other Cohesive Forces Affecting Powder Fluidization, *Powder Technology*, Vol. 58, 1989, 1-10). In 1973, Prof. Geldart of Bradford University in England proposed to divide all powders into four groups and used letters A-D to denote the groups as Aeratable, Bubbly-Ready, Cohesive, and Different (initially named Spoutable), respectively (FIG. 1). Geldart groups A and B powders are generally in the range of 25-35 microns to 700-900 microns. Both groups can be easily fluidized, but group A powders have a much higher potential to increase in volume when fluidized. Group D powders are about 700-900 microns to several millimeters in size and are more suitable for spouting than fluidizing. Group C powders are those smaller than about 25-30 microns and are very cohesive.

Typical characteristics of group C powders when subjected to fluidization include agglomerating and clumping into a packed bed, channeling or even completely defluidizing, and intermittency or choking when transported (Zhu, J., Fluidization of Fine Powders, Chapter 10 in *Advances in Granular Materials: Fundamentals and Applications*, London: Royal Society of Chemistry, 2003, pp 270-295). These features make group C powders very difficult to handle. When used for powder coating, these characteristics translate into poor fluidization in the feed hopper, uneven flow in the transport hose, sticking and accumulating on the inside of the hose and gun, and puffing at the spray gun, leading to an inconsistent coating surface that is unacceptable. This is the major hurdle that has prevented the powder coating industry from using group C fine powders. With a relatively lighter density, powder coatings usually have the Geldart group A-C boundary around 22-25 microns so that a powder coating with D50 in this range becomes very sensitive to its particle size distribution.

The cohesive nature of group C powder comes from the fact that when the particle size becomes smaller, the relative magnitude of the interparticle forces increases significantly in relation to the gravitational and drag forces exerted on the particles. Such strong interparticle forces make the individual particles cling to each other and therefore form agglomerates.

There are three types of interparticle forces, the van der Waals force, the electrostatic force, and the capillary force (Visser, J., An invited review—Van der Waals and other Cohesive Forces Affecting Powder Fluidization, *Powder Technology*, Vol. 58, 1989, 1-10; Zhu, J., Fluidization of Fine Powders, Chapter 10 in *Advances in Granular Materials: Fundamentals and Applications*, London: Royal Society of Chemistry, 2003, pp 270-295; and Seville, J. P. K., Willett C. D., and Knight, P. C., Interparticle Forces in Fluidization: a Review, *Powder Technology*, Vol. 113, 2000, 261-268).

Van der Waals force is a collective term taken to include the dipole/dipole, dipole/non-polar and non polar/non-polar forces arising between molecules (Seville, J. P. K., Willett C. D., and Knight, P. C., Interparticle Forces in Fluidization: a Review, *Powder Technology*, Vol. 113, 2000, 261-268). This force always exists and is usually the largest interparticle force among the three types. Van der Waals force only becomes noticeable when the particles come sufficiently close, for example 0.2 to 1.0 nanometer apart (Visser, J., An invited review—Van der Waals and other Cohesive Forces Affecting Powder Fluidization, *Powder Technology*, Vol. 58, 1989, 1-10). Van der Waals force may be understood by imagining molecules instantaneously possessing different electronic configurations, giving them a dipolar character. This temporary situation will act on the neighboring molecules, also rendering these dipolar. As a result thereof and as a consequence of the general attraction between dipoles, molecules attract each other, even when they are apolar singly.

Electrostatic force can occur by tribo-electric charging or by the formation of a potential difference when particles of different work functions are brought into contact. The resulting Coulomb attraction makes the powder adhesive. Capillary force comes from the fluid condensation in the gap between the particles in close contact, resulting in liquid bridging force among particles. It should be noted that a higher capillary force comes at the expense of the electrostatic force, which diminishes with the increase of moisture.

Due to the strong interparticle forces, Group C powders are generally considered non-fluidizable and non-transportable pneumatically, and therefore, non-sprayable. In term of fluidization, fluidization is sometimes possible but in the form of agglomerates instead of primary particles. As a result, Geldart C powders are considered unusable in most cases. On the other hand, demands for the use of group C powders are increasing in many industries because the smaller particle size does bring many benefits. For example, group C particles have been widely used in new advanced materials and chemical industries due to their special characteristics. With their high specific surface area, smaller primary particles commonly lead to a better quality of final product in the ceramic industry or in powder metallurgy. Finer powders also lead to significant improvement of the coating finish in the powder coating industry (Zhu J and Zhang H, Ultrafine powder coatings: An innovation, Powder Coating, 16(7), 39-47, 2005; and Zhu J and Zhang H, Fine powder coatings offer many other advantages besides better surface quality and thinner films, Powder Coating, Feb. 7, 2006.). Aerogel powders can provide very high surface area for catalytic chemical reactions. Moreover, fine and ultrafine powders are of increasingly important in the pharmaceutical, plastics, and food industries (Zhu, J., Wen, J., Ma, Y. and Zhang, H., 2004, Apparatus for Volumetric Metering of Small Quantity of Powder from Fluidized Beds, U.S. Pat. No. 6,684,917, and Zhu, J., Luo, Y., Ma, Y. and Zhang, H., Direct Coating Solid Dosage Forms Using Powdered Materials", U.S. Patent, filed 2005). Therefore, solutions to these problems will break the barrier to the applications of fine paint powder and open up very promising markets for the powder coating industry and other industries.

In response to these needs, different measures have been taken to enhance the flowabilities, fluidization, and transportation of these group C powders. Those measures are usually referred to as fluidization aids, which include mechanical stirring, acoustic, mechanical, or ultrasonic vibrating, addition of much larger particles to provide extra stirring, and pulsation of fluidization-gas, just to mention a few. Some of these measures are more effective than others for a given group C powder, but the effectiveness of almost all of these measures tends to diminish as the powder becomes finer in size. Adding much smaller particles such as fumed silica particles is another way to increase the fluidization capability of some group C powders and has been practiced in the industry for decades. On the other hand, adding many other finer particles has not ed increase the flowability of fine powders. Therefore, the mechanism is not yet clearly understood, although some have speculated that a "lubricant" effect may be occurring.

Powder coating is an environmentally friendly technology because it eliminates the use of organic or inorganic solvents and makes it possible to reuse the over-sprayed paint. However, the current technology with powder coatings does not provide as high a finish quality as "wet coatings", hindering the further growth of the application of this technology. As mentioned in U.S. Pat. No. 5,171,613, powder coatings are generally characterized as having poor film uniformity, poor distinctness of image and with a heavy orange peel look. Also, excessive film thickness is required to obtain even such limited performance properties, because thinner films are difficult to obtain due to the large particle size.

Currently, many important coatings, such as color coats and clear coats on car/truck bodies, are still wet coated, due to the quality problems and excessive thickness associated with powder coatings. While powder coating has begun to be used as primers for automobile bodies, there are problems such as with particle agglomerations, causing imperfections to the coating surface such as seeds and particle balls, which require post polishing. Such post polishing, while trouble-some, is possible for primer but not realistic for top clear coat.

The lower quality surface finish of powder coating ("orange peel" imperfections etc.) and unnecessary excessive thickness, normally 45-50 microns and more, are mainly caused by the large average particle size of 30-50 microns currently used in the powder coating industry. It is understood that ultrafine powders with average particle size of <20 microns can greatly improve the quality of powder coating finishes, making them comparable with wet coating finishes. At the same time, the said ultrafine powders can also make it possible to apply thin film coatings of 10 to 25 microns or even less. However, coating powder of less than 20 microns fall into the Geldart C group and is therefore difficult to apply in the powder coating industry.

The powder coating industry has worked on improving the flowability of fine paint powder to make their applications possible, for example, U.S. Pat. Nos. 5,567,521, 5,498,479, 5,635,548, and 5,948,866. Some of them proposed to add fluidization additives (such as silica, aluminum oxide, aluminum hydroxide and other minerals etc.) to the fine powder to increase its fluidity. Of these patents, some of them also specified the methods of incorporating the additives into the fine powder (U.S. Pat. Nos. 5,567,521 and 5,498,479) while most others did not. These patents which did mention the incorporating method specified that the additives are dry-blended with the fine powder using a high-velocity (high-shear) mixer, such as Henschel Mixer available from Mitsui Miike Co., Ltd.

In addition to powder coating, there are also cases where mixing and dispersion of a small percentage of relatively finer particles into bulk larger particles are required and a well dispersed mixing at the micro level can be beneficial. For example, selective laser sintering is a process where metal particles coated with a thin layer of plastic materials (or some other materials which have a low melting point) are "fused" together by laser beams to form a structured part.

The function of the plastic coating is to "glue" the metal particles together and thereafter the plastic materials are completed removed during high temperature sintering where the metal particles are finally "fused" together. In this process, it is beneficial to use smaller metal particles so that the final part has smoother surface. In order to ensure the finer metal particles flow properly, superfine plastic (or other material) particles can be added. In this case, however, the addition of superfine plastic particles not only improves the flowability of the bulk metal particles, but can also form a layer of superfine plastic particles, if dispersed well, on each larger metal particle. Such a "particle coating" can replace the plastic coating applied currently, leading to significant savings by cutting out an extra step. It should be noted that this can also be expanded to the cases of superfine plastic particles coated on another type of plastic particles and superfine metal particles with lower melting temperature to larger bulk metal particles having high melting temperature. Additionally, such a coating layer does not need to be a continuous layer, to act as a "gluing" agent.

The inventors have been pursuing breakthroughs in the applications of fine powder technology, including fine paint powder coating technology. Some key technologies have been developed for uniform dispersion of fine and superfine particles into bulk particulate materials, for the smooth fluidization and pneumatic transportation, and for uniform spray of fine powders onto the product surfaces. One aspect of the technologies comprises the proposed fluidization additives and the formulation of these additives which provides the best fluidization aids to the fine powder (U.S. Pat. No. 6,833,185). In particular, U.S. Pat. No. 6,833,185 discloses that in order for the fine powder additives to work on the improvement of flowability of the fine powders, the additive particles need to be significantly smaller and also to have a much lower apparent particle density. Only when these two conditions are met are such additives effective in improving flowability. A higher ratio normally gives a better improvement to the flowability.

In various industries involving powder handling, higher powder flowability is generally needed for operations in powder manufacturing and application. For example, it has been practiced for decades that fluidization additives such as silica and aluminum oxide are dry blended into the powder to enhance its flowability and thus make the operations feasible. Fluidization additives are usually blended into the bulk powder in a blender (such as a tumbler or some other kind of low-shear mixer) or in some cases in a high shear mixer, after the powder is made. In some occasions, the fluidization additives are incorporated into the powder before the powder is mechanically pulverized.

For instance, some regular size powder coatings (D50>30 to 35 microns) exhibits strong cohesiveness because of the addition of one or more chemical component in the powder formulation, and therefore fluidization additives (silica and aluminum oxide) are commonly added into the paint chips to be ground. In this case, the additives are dispersed into the powder through the powder pulverizing process which resembles a high shear mixing process. For fine powders, the only mixing method proposed by other researchers is the use of a high shear mixer (U.S. Pat. No. 5,567,521, U.S. Pat. No. 5,498,479).

However, these blending methods suffer from several drawbacks. One such drawback is that the mixing temperature and time have to be tightly controlled for temperature sensitive materials (including paint powders and other powders comprising organic materials). In most cases, there always exist "dead regions" in the high-shear mixer, and therefore, non-dispersed additives are left in the powders which is detrimental for many cases. For example, in fine powder coating applications, the non-dispersed additives in powder coatings, mostly in agglomerated forms, would cause defects (seeds and bits) on the finished surfaces.

In addition, in the mixing methods where the additives are incorporated before the milling process, some of the additives (about 30%-80%) are known to be lost through the cyclone to the bag house (if a cyclone is employed to collect the milled powder). The remaining additives are also not necessarily uniformly dispersed, to act effectively as flow agent. During the mixing process, some of the additive particles could be "pushed into the particle surfaces of the powder being modified, leading to loss of functionality of the additives.

These drawbacks are affordable for some applications such as regular size powder coatings. Firstly, regular coating powders do not need as much fluidization additives as fine coating powders, which means that much less additive agglomerates will be present and thus much less chances of causing finish defects. Secondly, a regular size powder coating normally forms a coating film of 60-100 microns. A film with this thickness would hide almost all the additive agglomerates and show a defect-free finish.

For a fine powder, especially for a fine coating powder, however, some of these drawbacks would no longer be affordable. A representative film thickness of fine powder coating is around 10 to 50 microns. The inventors have discovered that the sizes of additive agglomerates resulting from the above-mentioned prior-art mixing methods (such as high-shear mixer) often reach 50 microns and occasionally reach 100 microns, depending on the mixing shear stress, mixing time and how inactive the "dead region" is in the high shear mixer. Many seeds and bits are normally present on the fine powder coating finishes, if the powder is prepared using these known mixing methods. This is due to the fact that some of the additive agglomerates are too large to be covered by the paint film.

Therefore, more effective mixing methods with following characteristics are highly desirable for fine powders. Such mixing methods should not only ensure homogenous mixing of fluidization additives into the fine powder in a macro-scale, but also do so on a micro-scale. Such a micro-level mixing step is needed for very good dispersion of additives into the fine powder, to ensure the maximum functionalities of the additives is realized. The mixing methods should ensure that the agglomerate sizes of the dry blended additives are smaller than the size of the bulk particles themselves. For powder coating, the agglomerate size should be smaller than the film thickness of the fine powder paint application so that no defects would be caused by the presence of any additive agglomerates. The mixing methods should retain, preferably, as much of the ultrafine additives in the fine powder as possible to maintain a lower cost.

SUMMARY OF THE INVENTION

Embodiments of the present invention provide methods that can be used to effectively disperse smaller superfine particles uniformly into a powder comprised of larger fine particles. The embodiments are based on a mechanism, recently discovered by the inventors, on how to blend additives of smaller size into powders of larger size, and particularly how to blend superfine additives in the nanometer or submicron size range into fine powders of submicron or micrometer range, to achieve optimum dispersions of additives and to avoid disadvantages caused by the non-uniform dispersion of the additives and the agglomeration of additives.

The methods may be used for mixing many types of differently sized particles, but is found to be quite advantageous for mixing superfine fluidization additives blended into fine paint powders, to eliminate problems caused by non-optimum dispersions of flow additives and by the existence of large agglomerates of additives, such as pin holes and/or bits on the paint surfaces.

In one aspect of the present invention there is provided a method of incorporating superfine additive particles into fine powders, comprising the steps of:

a) mixing a selected amount of superfine additive particles into a powder comprised of fine powder particles to give a mixture having macro-scale homogeneity between the superfine additive particles and the fine powder particles; and b) sifting said mixture by passing said mixture through a sifter configured with aperture sizes in a range from about 1 to about 1000 micrometers to break up agglomerates of both the superfine additive particles and the fine powder particles and to disperse said superfine particles onto said fine powder particles to achieve micro-scale homogeneity.

In another embodiment of the present invention there is provided a method of incorporating superfine additive particles into fine powders, comprising the steps of:

a) mixing a selected amount of superfine additive particles into fine powder particles to give a mixture having macro-scale homogeneity between the superfine additive particles and the fine powder particles;

b) sifting said mixture by passing said mixture through a sifter having aperture sizes in a range from about 1 to about 200 micrometers to break up agglomerates of both the superfine additive particles and the fine powder particles to achieve micro-scale homogeneity and to disperse at least some of the superfine additive particles onto the fine powder particles; and c) repeating step b) to increase adhesion of the superfine additive particles onto the fine powder particles.

The present invention also provides for an apparatus for incorporating superfine additive particles into fine powders, comprising:

a) a macro-scale mixer configured to dry mix a pre-selected amount of dry superfine additive particles with dry fine powder particles to give a mixture having macro-scale homogeneity between the superfine additive particles and the fine powder particles; and b) a micro-scale means for breaking up agglomerates of both the superfine additive particles and the fine powder particles and for dispersing the superfine particles onto the fine powder particles to achieve micro-scale homogeneity and enhance the flowability of the mixture.

BRIEF DESCRIPTION OF THE DRAWINGS

The invention will now be described, by way of non-limiting examples only, reference being made to the accompanying drawings, in which.

DETAILED DESCRIPTION OF THE INVENTION

Generally speaking, the embodiments described herein are directed to methods and apparatuses for uniformly dispersing additive particles into fine powders. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to methods and apparatus for uniformly dispersing additive particles in fine powders.

The present invention solves the technical problem of uniformly blending superfine additive particles into fine powders, and more particularly, the present invention solves the problems associated with uniformly blending and dispersing selected amounts of powders comprised of nano-sized particles into powders comprised of micro-sized particles.

Embodiments of the present invention provide methods and devices for blending a small fraction of additive particles with fine powders where the size of the fine particles is larger than the size of the additives. In particular the present invention provides methods for blending fine additive particles into bulk fine Geldart Group C powders, to achieve the desired and optimum effects of additives. More particularly, the present invention provides an effective means of uniformly blending nanometer to submicron sized superfine fluidization additives into submicron to micron fine powders. In a particular application the submicron to micron sized fine powders are fine paint powders and the method of the present invention can achieve optimum dispersion of additives into the powders thereby avoiding problems caused by non-uniform dispersion of the additives and the agglomeration of additives.

In the field of powder coating, the present invention discloses how superfine fluidization additives are blended into fine paint powders, to eliminate problems caused by non-optimum dispersions of flow additives and by the existence of large agglomerates of additives, such as pin holes and/or bits on the paint surfaces. The invention disclosed herein comprises two mixing steps, a macro-scale mixing and a micro-scale mixing, or their equivalences. The invention disclosed herein also provides ways for choosing the proper micro-scale mixing device and, in particular, for selecting screen mesh sizes and type of sifters alone with other process guidelines, to enhance the dispersion of superfine additives into the fine bulk particulate materials.

Specifically, the inventors discovered the following methods to ensure a good overall uniformity of additives in the fine powder and optimum dispersions of additive particles onto the surfaces of the fine powder particles. The methods also ensure that all additive agglomerates are broken down to either their primary particle form (single particles) or to very small agglomerates with a maximum size smaller than a given size, i.e. the sifter aperture or opening used in the dispersing process.

Broadly the methods can be broken into two: Method A: For a batch operation, a pre-blending process mixes the additives into the fine powder body uniformly on a macro-scale, followed by a micro-scale mixing process such as passing through a fine screen to disperse the particulate additives further onto the fine powder surfaces; and Method B: For a continuous operation, additives are continuously added into the stream of fine powder flow, with given mass flow ratios, at a point of the process flow upstream of a pre-mixer or its equivalent device for macro-scale mixing. Thereafter, a micro-scale mixing process such as passing through a turbo screen mixer provides more uniform dispersion of additives into the fine powder.

Thus the present invention provides a uniform mixture of two or more groups of particles with at least two constituent groups having significantly different average particle sizes, derived from a method comprising a macro-scale mixing process that provides an overall uniformity of additives in the fine powder, and a micro-scale dispersion process that ensures effective de-agglomeration and optimum dispersion of additives into the fine powder.

More particularly, for fine powder coatings on metal, wood, plastics and on drug forms (tablets and beads etc.), the invention provides an effective method to maximize the effectiveness of additives and to avoid defects, such as pin holes and/or bits on the paint surfaces, on finish surfaces caused by large agglomerates and non-uniform dispersion of additives. In another particular case, this invention provides an effective technique to maximize the effectiveness of the nano-sized fluidization additives for fluidizing ultrafine pharmaceutical powders (in the range of 0.1 to 10 microns) for pulmonary drug delivery, so as to increase the accuracy and efficiency of drug dispensing and delivery. In yet another particular case, the present invention also provides a method of enhancing the handle-ability of Group C fine powders for the selective laser sintering process, to obtain products of smoother surface and stronger structure. In yet one more case, this invention provides an effective method to incorporate a small fraction of functional nano or micronized particles into bulk particular materials to provide additional properties to the bulk particular materials, either in their exiting powder form or in some applied form (such as cured surface from powder coating).

This invention also provides a general method to disperse very small particles such as submicron and nano particles into bulk particulate materials. In particular, this invention provides excellent methods to disperse and mix functional nano particles into particular materials to obtain special effects. For example, uniformly dispersing nano carbon tubes can significantly increase the electrical conductivity of the bulk powder. When nano carbon tubes are dispersed into coating powder, the final coating not only has excellent electrical conductivity but also higher mechanical strength. When nanoparticles specially treated to express hydrophobicity are added into resin (coating) powders, the inventors have produced surfaces of extremely high hydrophobicity with surface contact angle of 160 degree, reaching the true lotus effect.

In another embodiment, the present invention also provides a general method to disperse a fraction of relatively finer particles into larger bulk particles and to coat the finer particles onto the larger particles. Here the uniform dispersion of those finer or superfine particles causes a significant portion of them to stick onto the large particles and thus form a dry coating on the surface of the larger particles. For the selective laser sintering process, such dry coating can replace the pre-coating of a plastic layer onto the metal particles and thus eliminate an extra step in the process. The dispersion of those finer particles, typically in submicron or nanometer range, of course, also significantly improves the flowability of the bulk powders so that finer bulk powders can be used for the process, which in turn lead to smoother surface of the final Selective Laser Sintering product. Likewise, fine or superfine (plastic, glass or other materials) particles can be dry-coated onto relative larger plastic particles for the selective laser sintering of plastic parts, using this invention. It can also be extended to dry coat fine metal particles with lower melting point onto bulk metal particles with high melting point.

The definitions for the additives and bulk powder materials and their relative sizes follow those in the previous U.S. Pat. No. 6,833,185), which is incorporated herein in its entirety by reference.

As used herein, the phrase "macro-scale mixing" refers to a mixing process, normally carried out in a low-shear mixer, that dry-blends the additives into the bulk powder, to such a "homogeneity" or "uniform state" that the average additive concentration in every and any 8 $cm^3$ cube of the mixture is within 10% variation of the overall average additive concentration AND there exists no additive agglomerate with a size larger than 5 mm. In other words, such a mixing only ensures a uniformity at millimeter scale.

As used herein, the phrase "micro-scale mixing" refers to a mixing process, normally carried out using the methods described in this invention, that further disperses the dry-blended fine additive particles inside the bulk powder body to such a "homogeneity" or "uniform state" that the average additive concentration in every and any 1 $mm^3$ cube of the mixture is within 10% variation of the overall average additive concentration AND there exists no additive agglomerates with a size larger is than 50 micrometers, and preferably no larger than 20 microns and more preferably no larger than 1 microns, depending on the application requirements.

As used herein the term "sifter" means any device having apertures, meshes or perforations and the like on a net, wired screen, or other supporting structure. When very small additive particles are passed through the sifter with larger powder particles, the additive particles will be more uniformly intermixed with the other larger powder particles, while coarse particles larger than the size of the apertures are separated from finer ones and thereby screened out of the resulting mixture.

As used herein, the term "about", when used in conjunction with ranges of dimensions, temperatures or other physical properties or characteristics is meant to cover slight variations that may exist in the upper and lower limits of the ranges of dimensions so as to not exclude embodiments where on average most of the dimensions are satisfied but where statistically dimensions may exist outside this region. For example, in embodiments of the present invention sifters having pore sizes between about 20 to about 55 micrometers are used but statistically there may be a few pores present outside this range, say at 18 or 19 nm at the lower end and 56 or 57 at the upper end. It is not the intention to exclude embodiments such as these from the present invention.

The present invention provides a dry mixing method that involves a pre-mixing process which mixes the additives into the fine powder body uniformly in a macro-scale level, followed by a fine screen mixing process which works in a micro-scale to disperse particulate additives into the fine powder, such as in the embodiments shown in FIGS. 2 and 3 to be described hereinafter.

The pre-mixing process is to achieve macro-scale mixing and is normally done by a low shear mixer which makes certain an overall homogeneity of the additives in the powder being treated at the macro-level. This pre-mixing job, of course, can also be conducted in a high-shear mixer if the operational cost is not an issue. The primary purpose of this macro-scale mixing is to disperse the additive particles into the bulk powder, but not necessarily very uniformly at micro-scale level. In other words, effort is not made to purposely break down possible agglomerates of the additives or the agglomerates of the bulk particles, although some agglomerates especially very large ones would be broken down nonetheless. Further breakdown of smaller agglomerate is the task of the second, micro-scale mixing.

The fine screen mixing for micro-scale homogeneity is the key step in the process of additive homogenization. In the present invention, a screening operation is used to further break down the additive agglomerates to an extent that the additives are well dispersed into the fine powder at micro-scale level and it has been observed that there is not any additive agglomerate larger than the mesh size of the screen present in the treated powder. Specifically, for fine powder coating applications, the preferred mesh size is 55 micrometers or less. More specifically, for most fine powder coating applications, the required coating film thickness is less than 45 micrometers and the preferred mesh size is smaller than 45 micrometers. Even more specifically, for some applications requiring coating film thickness less than 20 micrometers, the preferred mesh size is smaller than 20 micrometers.

Figure 2:
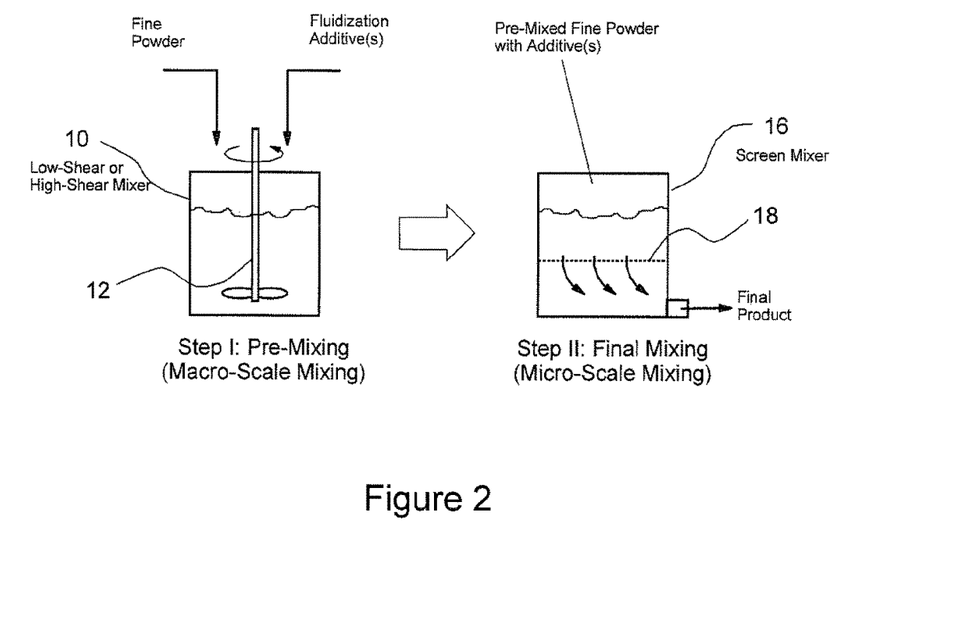
FIG. 2 shows an embodiment of an apparatus for mixing powder particles with fluidization additives in a batch operation in accordance with the method of the present invention.

Referring to FIG. 2, for preparing the powder mixtures in a batch operation, fine additives are added into the bulk powder and then mixed at macro-scale in a pre-blending process in a powder mixer 10 for the first step macro-scale mixing of the two powders in which the mixer 10 includes a propeller 12 which may be either a low shear or high shear mixer depending on the rotational velocity of the propeller 12. After this step the pre-mixed powder is placed into container 16 (a screen mixer) for the second step or final micro-scale mixing step. Screen mixer 16 includes a fine screen 18 to disperse the fine particulate additives further in the bulk powder.

Figure 3:
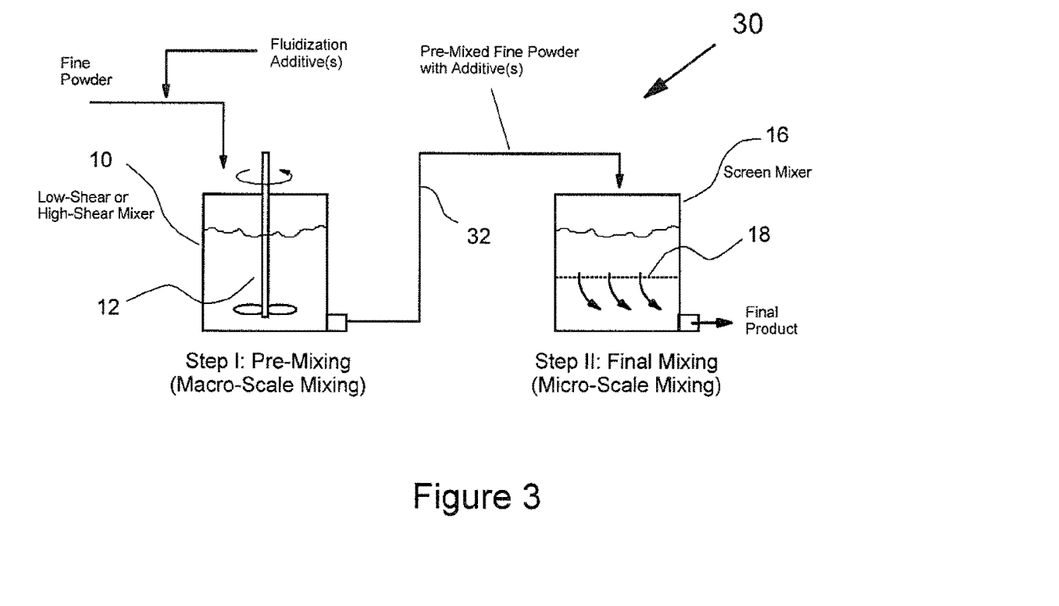
FIG. 3 shows another embodiment of an apparatus for mixing powder particles with fluidization additives in a continuous operation.

For continuous operation, an apparatus such as that shown generally at 30 in FIG. 3 may be used. Additives are continuously added into the stream of bulk powder flow, with given mass flow ratios, at a point of the process flow upstream of a pre-mixer or its equivalent device. The mixture then flows to the mixing container 10 for macro-scale mixing. After the first pre-mixing step the macro-mixed powder is then flowed to the second mixing chamber 16 which is now connected by a conduit 32 for the second micro-scale mixing step where it is passed through a fine screen 18 to provide more uniform dispersion of additives into the bulk powder. In FIGS. 2 and 3 the screen mixer 16 may be a rotary sifter, an ultrasonic sifter, a turbo sifter, or any other type of screen sifter that facilitates the passage of the mixed powder flow through a fine screen. In the continuous operation case, a pre-mixing mechanism is still needed for the overall homogeneity of additives in the powder being treated.

Figure 4:
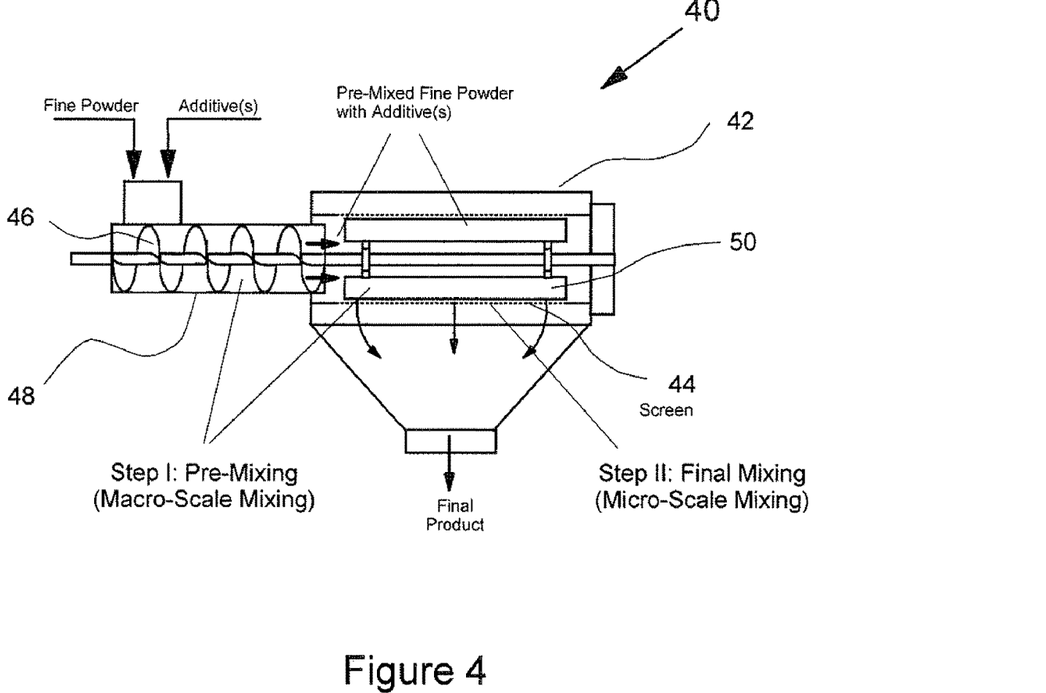
FIG. 4 shows another embodiment of a mixing apparatus which includes a rotary sifter with screw feeder serving as both a macro-scale pre-mixer and a micro-scale final mixer.

FIG. 4 shows an alternative embodiment of the mixer 40 which uses a screw 46 incorporated in the screw feeder 48 as a pre-mixer which ensures the overall bulk homogeneity. The propellers 50 in the sifter 42 also acts as a pre-mixer which helps to ensure the overall homogeneity. The screen 44 on the rotary sifter 42 serves the purpose of micro-scale mixing.

Figure 5:
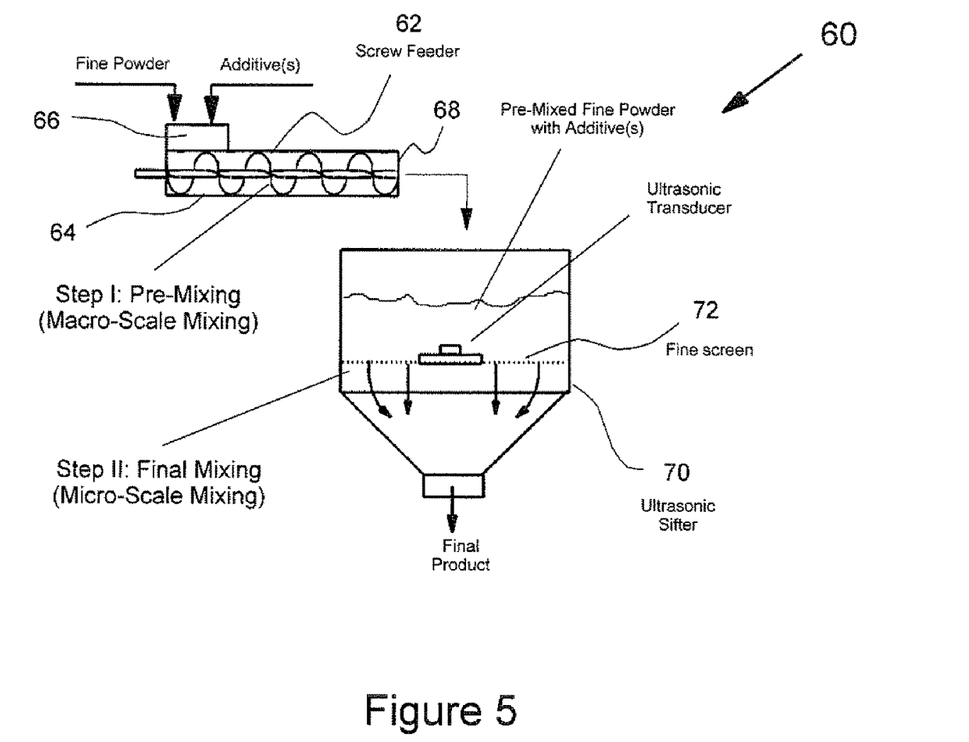
FIG. 5 shows another embodiment of a mixing apparatus which includes an ultrasonic sifter system with screw feeder serving as both a macro-scale pre-mixer and a micro-scale final mixer.
Figure 6:
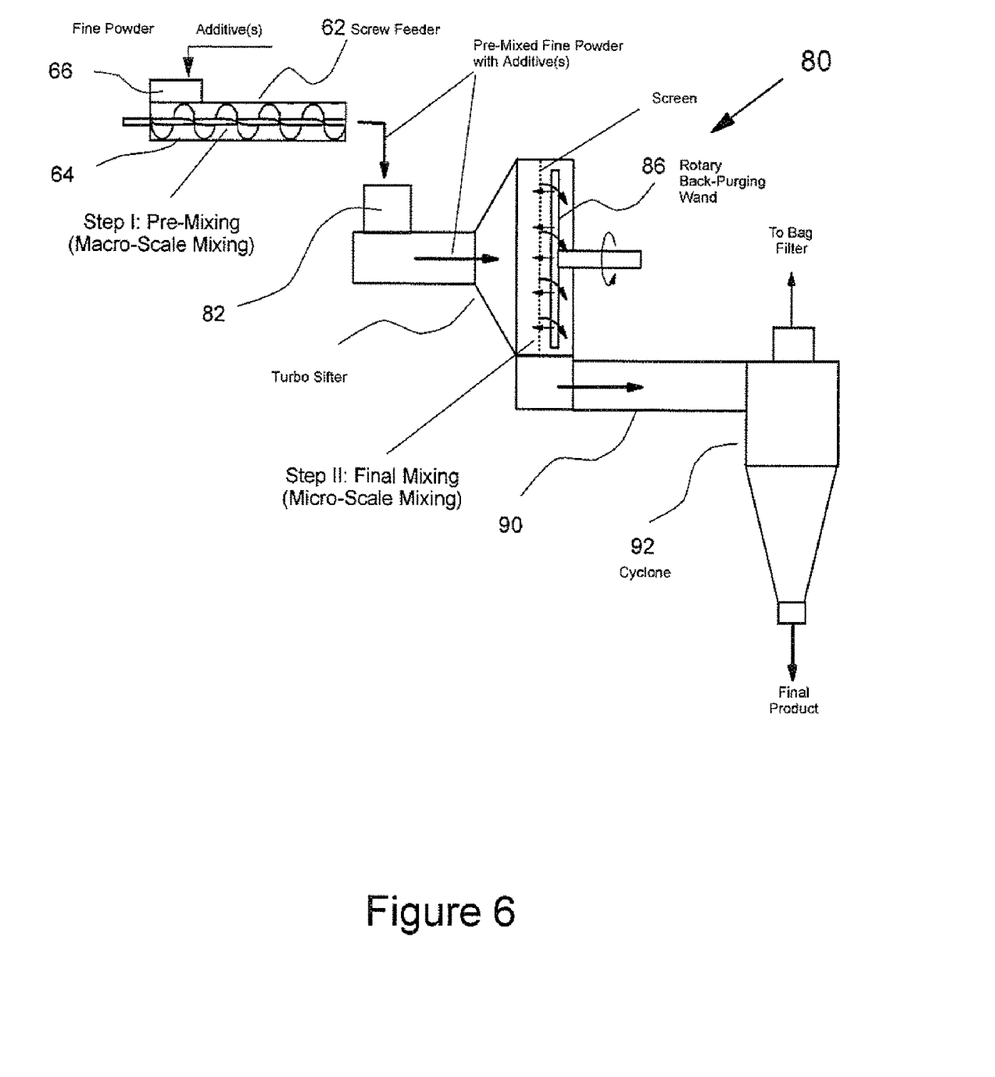
FIG. 6 shows another embodiment of a mixing apparatus which includes a turbo sifter system with screw feeder serving as both a macro-scale pre-mixer and a micro-scale final mixer.

Further embodiments of mixers using the two step mixing process disclosed herein are shown in FIG. 5 and FIG. 6, with FIG. 5 showing an ultrasonic sifter system with screw feeder and the region above the ultrasonic screen serving as a macro-scale pre-mixer and the fine screen under ultrasonic vibration serving as a micro-scale final mixer, and FIG. 6 showing a turbo sifter system with screw feeder and the connection pipe serving as a macro-scale pre-mixer and the turbo sifter serving as a micro-scale final mixer. More particularly, the embodiment shown at 60 in FIG. 5 includes a screw feeder 62 located inside pipe 64 which performs the macro-scale mixing. The two differently sized particles are introduced into the input port 66 or at a point upstream of the input port 66 and the pre-mixed powder mixture, after being driven through pipe 64 drops out the other end 68 into an ultrasonic sifter 70. The fine screen 72 in the ultrasonic sifter 70 facilitates the micro-scale mixing.

FIG. 6 shows another embodiment of a mixing apparatus at 80 which includes the same screw feeder 62 as used in apparatus 60, but now the powder mixture pre-mixed by the screw feeder 62 is flowed into the input 82 of a turbo sifter 84 which is employed to carry out the micro-scale dispersion. In both cases, the screw feeder 62 is used to feed the powder mixture (with additive(s) added in already) into the sifter 70 (FIG. 5) or turbo sifter 84 (FIG. 6) so that the screw feeder 62 itself, in addition to feeding the powder, also performs as a pre-mixer. The turbo sifter 84 forming part of apparatus 80 includes a rotary back-purging wand 86.

The powder mixture after it has been subjected to the second fine mixing step in the turbo sifter 84 is then fed into a conduit 90 and the mixed powder is fed into a gas-solid separator 92 (preferably a cyclone but other gas-solid separators known to those skilled in the art may be used) for the separation of the mixed powder from the gas stream. The final product is then collected at the bottom of the cyclone.

The various alternatives of the sifter used for the final screen mixing can be any type used for powder processing. It can be a vibratory type, a rotary type, an ultrasonic type, a turbo type or any other type as long as a required production capacity for a certain application can be realized with the chosen type of sifter. However, preferred sifters which can be used include a rotary type (with de-blinding mechanism) or an ultrasonic type of sifter for fine coating powders because fine paint powders blind the screens easily and exhibit extraordinary difficulties in passing through the fine screens without the aids of agitations to de-blind the screen. A turbo type sifter involves an airflow to carry the powder through the screen so that it is more efficient, but it normally requires a particle separator, which may cause some loss of additives. However, turbo screen sifter is still a good choice if the fine additives can be effectively retained and/or the cost of additive is not a concern.

In both cases shown in FIG. 5 and FIG. 6, a screw feeder 62 is used to feed the powder mixture (with additive(s) added in already) into the sifter 70 (FIG. 5) and 84 (FIG. 6). The screw feeder 62 itself, in addition to feeding the powder, also performs as a pre-mixer. It is preferred for the screw feeder 62 to have a longer auger and a rotating agitator to promote a better pre-mixing. Alternatively, a separate mixer such as that shown in FIG. 3 can be utilized to conduct the pre-mixing for a continuous operation. This embodiment shall give a better pre-mixing than a simple screw feeder.

Figure 7:
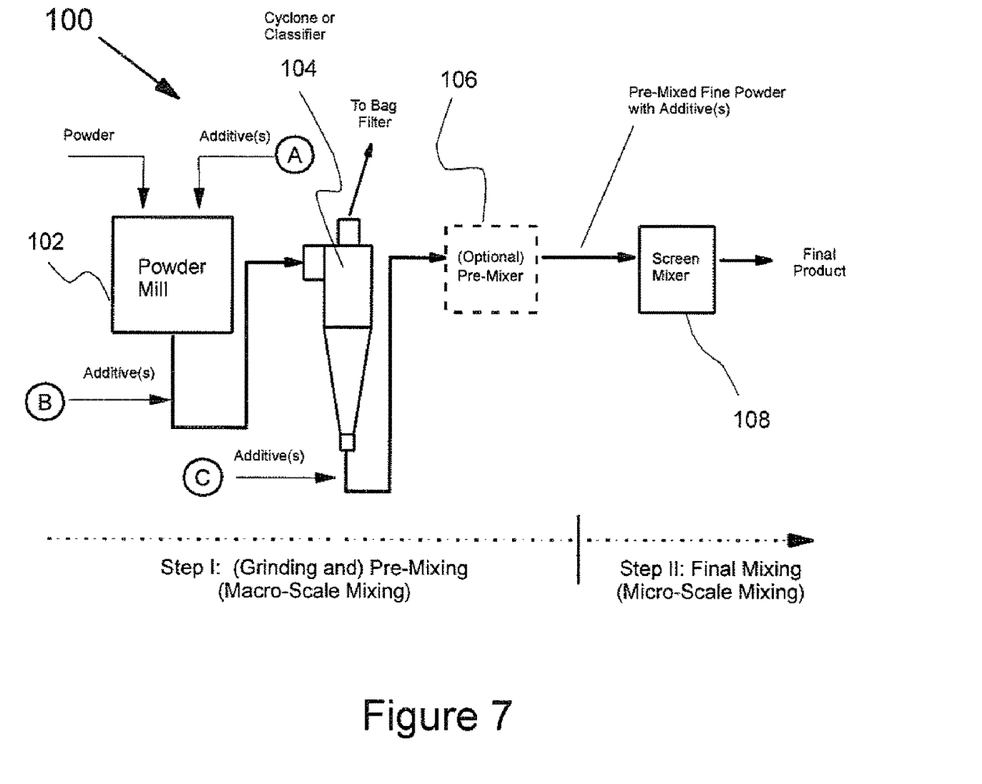
FIG. 7 shows a schematic of an embodiment of powder process line for mixing powders showing the possible points in the process flow where the additive(s) may be incorporated.

In a continuous process, the additives may be incorporated into the fine powder at many points of the process flow upstream the pre-mixing operation and of course the final fine screen mixing operation. For example, FIG. 7 shows an apparatus 100 which provides for several possible places for the addition of the additive particles in a powder processing line which grind coarse powder down to fine powder and then incorporate additive particles into the fine powder using the present invention. In apparatus 100 shown in FIG. 7, a powder mill 102 is included which grinds down the large sized powder feed, a cyclone separator or a classifier 104 is included to separate excess gas and/or particles of undesirable sizes from the powder bulk, an optional pre-mixer 106 for macro-scale mixing if necessary, and a screen mixer 108 for micro-scale mixing.

The optional pre-mixer 106 located downstream of cyclone 104 can be a static flow mixer installed inside the transportation pipe which feeds the powder mixture leaving cyclone 104 to the screen mixer 108. As shown in FIG. 7, the additives can be incorporated into the fine powder at several points of the process flow such as the points before the powder grinding mill 102 at point A, or after the powder grinding mill 102 at point B, or at the end of the grinding process at point C downstream from the powder mill 102. In the latter case, a pre-mixer is required to pre-mix the additive particles with the fine powder before the final screen mixer.

In the cases of points A and B, however, some of the additives (normally 30% to 80%) would be lost because the additives are extremely fine (having sizes predominantly in the nano-size range) and the cyclone or classifier 104 cannot capture them with a high efficiency. Therefore, it is beneficial to incorporate the additives closer to the pre-mixing unit at point C downstream from the cyclone 104.

The present invention provides many advantages over other mixing methods. For example, the present invention provides methods to effectively disperse dry-blended additives into fine powders, ensuring not only homogeneity on a macro-scale but also providing excellent dispersion in micro-scale. This intimate mixing on both macro and micro scales is important for achieving the maximum functionality of the additives.

Figure 8:
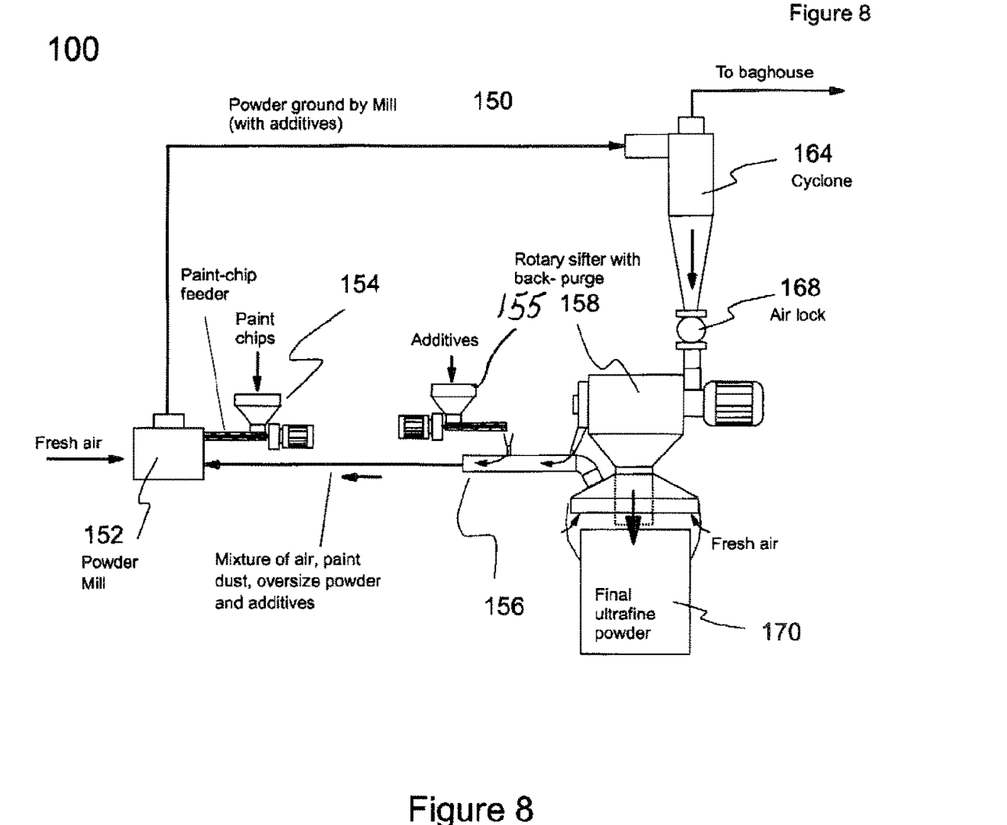
FIG. 8 shows another embodiment of an apparatus of a powder mixing process line for a continuous mixing process with the ultrafine powder additives incorporated upstream of a powder mill.

FIG. 8 shows an embodiment of an apparatus shown generally at 150 for a continuous mixing process with the ultrafine additives incorporated before a powder mill forming part of the apparatus. More particularly, paint chips are fed into a powder mill 152 by a paint-chip feeder 154 and additive powders are fed into the powder mill 152 from a fine powder feeder 155 located upstream of powder mill 152. The formulated additives are fed into the re-circulating pipe line 156 from the rotary sifter 158 and are carried by the re-circulating air to the powder mill 152 where the additive powder is premixed with the paint powder, in a macro-scale mixing operation. Optionally a static mixer (not shown) may be included in pipe line 156 between downstream of the powder additive feeder 155. Fresh air is input to the powder mill and once the paint particles have been pulverized and mixed with the additives in the powder mill, the mixture is pneumatically conveyed to the cyclone 164 which collects the mixed powder particles having the desirable dimensions.

Extremely fine particles that cannot be caught by the cyclone will caught by the baghouse and those fines may be recycled to a point before powder extrusion as raw materials. The premixed paint powder with additives is then further processed by the rotary sifter 158 which further disperses the ultrafine additives into the paint powder in the micro-scale mixing step, while at the same time, screening out the oversize paint particles. The rotary sifter 158 has a back purge capability to prevent the blocking of the screen mesh. The oversize particles together with the dust generated from packing are re-circulated back to the powder mill by the re-circulating air where they are ground finer and recaptured in the next cycle. The final powder mixture of paint powder mixed with ultrafine additive is passed through the rotary sifter to the collection bag 170. Some pre-mixing occurs in pipe 156 between very fine particles (which "float" from collection bag 170) and very coarse particles (which cannot pass through the screen 158) prior to entering the powder mill 152.

The present invention also provides methods to break down any agglomerates of the fluidization additives to sizes required by the specific applications. This is done by choosing the right mesh size of screen. There is no "dead region" so that there is not a single additive agglomerate larger than the mesh size that can pass through the screen in the final screen mixing process. For fine powder coatings for paint films, an important feature that should be exhibited by the paint films is that they be both thin and smooth so that fine paint powder flows during application to a surface without large agglomerates being incorporated into the paint layer. By choosing the right mesh sizes for the screen, the current invention satisfies these requirements for the fine powder coatings to give the best finish qualities.

The method of the present invention allows one to retain as much of the additives in the fine powder as possible, to maintain low cost, when the additives are incorporated in a point of the process flow, in which there is no downstream cyclone or classifier.

The present invention further provides methods to remove contaminants and large size infusible materials that could cause defects in the paint film. Since the mesh size of the screen sifter used for the final (micro-scale) mixing is determined by the target film thickness of the fine powder coating, the sifter also removes all contaminants and infusible materials larger than the film thickness, so that any remaining smaller contaminants and infusible materials are hidden inside the coating layer.

It is noted that a high-shear mixer may also be able to achieve micro-scale homogeneity, if several (say n) batches of mixing operations are carried out consecutively with the powder being completely removed from and replaced back to the mixer each time. This method can significantly reduce the amount of large size agglomerates from the "dead region". However, the production capacity will be reduced by n times and still there always be the chances for large size agglomerates (much larger than 20 to 50 micrometers) existing in the processed powder.

It also needs to point out that this invention can also be used for regular size powder coating, to significantly decrease the amount of additives required. Fumed silica, for example, is now often added into "regular" (group A powder with sizes 25-60 microns) coating powders to ensure their flowability. Since only a small fraction of the additives is effectively dispersed in the current industry practice, a much larger fraction of the additives than is actually required must be blended into the paint powder. When fumed silica is used as an ultrafine additive in the present invention, because the added fumed silica is well dispersed, it becomes much more effective in increasing the flowability, so that the amount required is significantly reduced. An even better way to incorporate the fumed silica is by mixing the fumed silica in a micro scale into a small amount of fine powder (normally less than 5% wt of the regular size powder) and then incorporating the mixture into the regular size powder. In this way the effectiveness of additives will be significantly increased since the added fumed silica is well dispersed. Because the additive becomes much more effective in increasing the flowability, the amount of additive required is significantly reduced.

In addition to improving flowability and fluidizability, the additions of superfine particles into powder coating materials can also have other benefits as well. For example, the addition of special hydrophobic nano particles leads to coated surfaces of the fine particles exhibiting a strong hydrophobic effect. The addition of nano carbon tubes can lead to coated surfaces of the fine particles exhibiting with very strong mechanical strength and very high electrical conductivity or super conductivity. In both cases, the nano particles should be well dispersed into the bulk coating powder, to be effective.

The following examples are for the purpose of illustration only and it will be understood that they are not meant to limit the scope of the present invention.

EXAMPLE

Polyester black paint powder of average sizes of 40-55 microns (volume-equivalent diameter) was first ground down to an average size of approximately 19 microns. This makes it a group C powder, which is difficult to fluidize. In order to utilize the fine coating powder, additives are added to assist the flow. A total of 4 methods are used to blend the additives: two methods described in the present invention, Method A with a rotary sifter (FIG. 4) and Method B with a turbo screen (FIG. 6), plus mixing with a high-shear mixer (Method C) and with only a low-shear mixer (Method D). The test results are shown in Table 1 and FIGS. 9-11 discussed in more detail below.

The fine paint powder without fluidization additives shows a very poor flowability with a high angle of repose, very low bed expansion ratio and a bumpy finish surface. The results from the two methods of the present invention, Method A (a rotary sifter) and Method B (a turbo screen sifter), show that both are very effective in dispersing the additives into the fine paint powder. This is supported by the low angles of repose and high bed expansion ratios as well as the smooth finish. The defect-free finishes also indicate that the additives agglomerates are all broken down to a point that none of them were able to sticks out of the paint surface.

Method C (high-shear mixer) also gives an effective dispersion for the majority of the additives, which is shown by the low angle of repose and the high bed expansion ratio. However, the finish quality does not satisfy the requirement for a thin and smooth finish, since many seeds are present on the paint surface due to the unbroken additive agglomerates from the "dead region" of the high-shear mixer. With only a low-shear mixing, Method D gives poor results in both flowability (higher angle of repose and low bed expansion) and in surface finish (some bumps with very significant seeds).

Figure 9A:
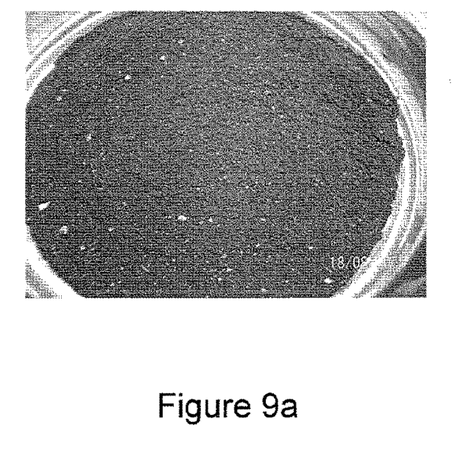
FIG. 9a shows a photograph of paint powder mixture after pre-screening (Method D only)
Figure 9B:
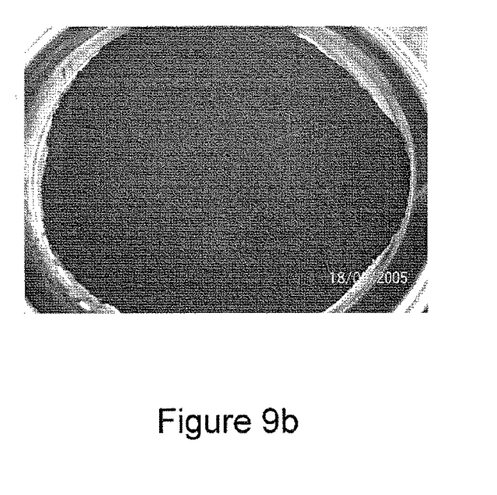
FIG. 9b shows a photograph of paint powder mixture after pre-screening and fine screening (Method A)
Figure 10:
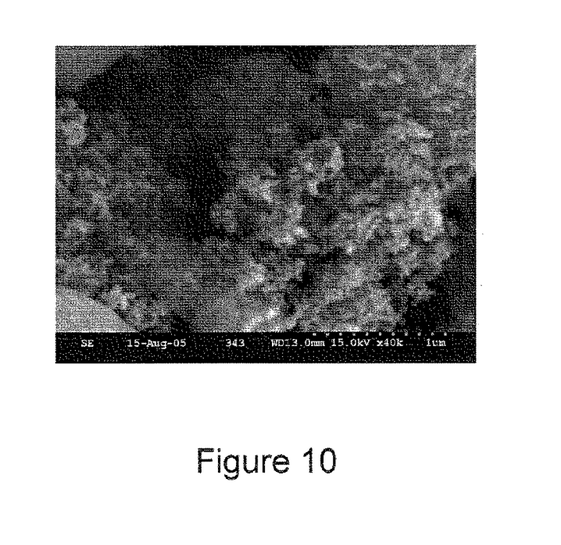
FIG. 10 shows a scanning electron micrograph (SEM) photo of large agglomerates of additives on the surface of a coating particle (Method D)
Figure 11:
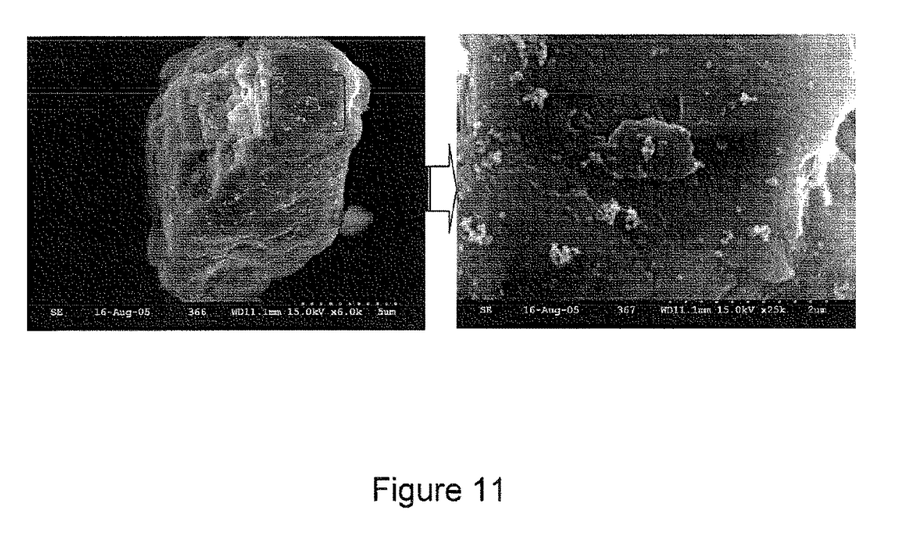
FIG. 11 shows a scanning electron micrograph (SEM) photo of small agglomerates of additives on the surface of a coating particle (Method A).

In these examples, Method D really just provides a pre-mixing, so that the additives are not well dispersed into the bulk powder. Method C does mix the additives more intensively with the bulk powder so that the paint powder mixture has a better flowability. However, since the high-shear mixer cannot ensure ALL large size additive agglomerates are broken down, some show up as seeds on the finished surface. This may be why some current fine paint powder products on the market still causes significant seeds although their flowability has been somewhat improved. Methods A and B, on the other hand, use the two-step mixing methods disclosed in this invention, resulting in both improved flowability and elimination of seeds.

a closer examination of the powder mixture after mixing using Method D and FIG. 9b shows the powder mixture after Method A. Large additive agglomerates are clearly visible in the former case, leading to significant amount of seeds in the final coating layer when applied. FIG. 10 shows a SEM (Scanning Electron Microscope) photo of a paint powder after the mixing Method D, where large agglomerates of additives can be observed on the surface of the coating particle. On the other hand, such large additives are not present on the surface of the coating particle after using mixing Method A, as shown in FIG. 11. Obviously, as discussed above, the two-step mixing methods have effectively dispersed the additives into either single primary particles or small agglomerates with sizes significantly smaller than the particle size of the bulk powder.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for incorporating superfine additive particles into fine powders, comprising:

TABLE 1

An example of the methods described in the present invention, with comparison to a high-shear mixing method

| | Fine paint powder without fluidization additives | Fine paint powder with fluidization additives using different mixing methods | | | |
|---|---|---|---|---|---|
| | | Method A - with a rotary sifter after pre-mixing | Method B - with a turbo screen sifter after pre-mixing | Method C - with a high-shear mixer | Method D - with a low-shear mixer |
| Type of Paint | Polyester black | (Same) | (Same) | (Same) | (Same) |
| Particle Size | Average: 19 microns | (Same) | (Same) | (Same) | (Same) |
| Fluidization Additives | N/A | 0.35% nano-rutile 0.2% zeolite | (Same) | (Same) | (Same) |
| Angle of Repose *⁻ | 43° | 33.5° | 33.8° | 33.8° | 41.2° |
| Maximum Bed Expansion Ratio **⁻ | 1.08 | 2.1 | 1.9 | 1.9 | 1.11 |
| Paint Film Thickness | 1.25 | 1.30 | 1.37 | 1.35 | 1.33 |
| Finish Quality | Bumps | Smooth | Smooth | Smooth with many seeds | Bumps with very significant seeds |

Method A - A regular rotary sifter modified to equip with back purging manifold to de-blind the screen.
Method B - A turbo screen sifter manufactured by Sweco with a cyclone that captures the processed powder.
Method C - A high-shear mixer manufactured by Lodige Process Technology.
Method D - A tumbler mixer
* Angle of repose is a commonly used parameter in determining the flowability of a powder. A lower angle of repose indicates a better flowability.
**⁻ Maximum bed expansion ratio is another commonly used parameter in determining the flowability of a powder. A higher expansion ratio suggests a better flowability.

FIGS. 9-11 show photographs that further support the results reported in Table 1. The photo shown in FIG. 9a shows a) a macro-scale mixer configured to dry mix a pre-selected amount of dry superfine additive particles with dry fine powder particles to give a mixture having macro-scale homogeneity between the superfine additive particles and the fine powder particles; and b) a micro-scale means for breaking up agglomerates of both the superfine additive particles and the fine powder particles for dispersing the superfine particles onto the fine powder particles to achieve micro-scale homogeneity and enhance the flowability of the mixture.

2. The apparatus according to claim 1 wherein said micro-scale means includes a sifter, said sifter having a screen with aperture sizes in a range from about 20 to about 100 micrometers.

3. The apparatus according to claim 1 wherein the said micro-scale means includes a sifter selected from the group consisting of vibratory screen sifters, rotary screen sifters, ultrasonic screen sifters, and turbo screen sifters.

4. The apparatus according to claim 3 wherein said rotary screen sifter includes a de-blinding mechanism.

5. The apparatus according to claim 1 wherein said micro-scale means is located downstream from said macro-scale mixer, and wherein the apparatus is configured for a continuous mixing operation such that the superfine additive particles are continuously mixed in with the fine powders and the mixture conveyed to said micro-scale means for the micro-scale dispersion.

6. The apparatus according to claim 1 wherein said macro-scale mixer is one of a low-shear mixer, a high-shear mixer, and a screw feeder to give a macro-scale homogeneity between the fine powders and the superfine particle additives.

7. The apparatus according to claim 1 wherein said macro-scale mixer includes a powder mill for pulverizing powder particles and a cyclone for selecting particles within a pre-selected size range located downstream of said powder mill, said macro-scale mixer having means for directing the mixture of pulverized powder particles and superfine additive particles to said cyclone, said cyclone being located upstream of said micro-scale means.

8. The apparatus according to claim 7 wherein said powder mill includes mechanical pulverizing means to accomplish the pulverizing chips or coarse powders into the fine powders.

9. The apparatus according to claim 7 wherein said powder mill uses hydrodynamic forces to accomplish the pulverizing the chips or coarse powders into the fine powders.

10. The apparatus according to claim 2 wherein said aperture size is in a range between about 20 to about 55 micrometers.

11. The apparatus according to claim 2 wherein said aperture size in a range between about 35 to about 50 micrometers.

12. The apparatus according to claim 7 wherein said micro-scale means includes a conduit in flow communication with said macro-scale mixer wherein powder particles that do not pass through said micro-scale means are redirected back to said macro-scale mixer through said conduit.

13. The apparatus according to claim 1 wherein the superfine additive particles are hydrophobic superfine additive particles such that the hydrophobic superfine additive particles dispersed onto the fine powder particles with micro-scale homogeneity results in coated surfaces of the fine powder particles exhibiting hydrophobicity.

14. The apparatus according to claim 1 wherein the superfine additive particles are carbon nanotube superfine additive particles such that the carbon nanotube superfine additive particles dispersed onto the fine powder particles with micro-scale homogeneity results in coated surfaces of the fine powder particles exhibiting electrical conductivity and mechanical strength.

15. The apparatus according to claim 1 wherein said micro-scale means includes a sifter, said sifter having a screen with aperture sizes in a range from about 1 to about 1000 micrometers.

16. The apparatus according to claim 1 wherein said micro-scale means includes a high-shear mixer.

17. The apparatus according to claim 1 wherein said micro-scale means includes a sifter, said sifter having a screen and a means for forcing the mixture of the superfine additive particles and the fine powder particles through said screen.

18. The apparatus according to claim 1 wherein the micro-scale means is capable of breaking up agglomerates of both the superfine additive particles and the fine powder particles to either a size of the fine particles or to very small agglomerates with a maximum size smaller than about 50 micrometers.

* * * * *